Dec. 15, 1964  H. M. LYLE  3,161,376
ORNITHOPTER TYPE AIRCRAFT
Filed Jan. 21, 1963  3 Sheets-Sheet 1
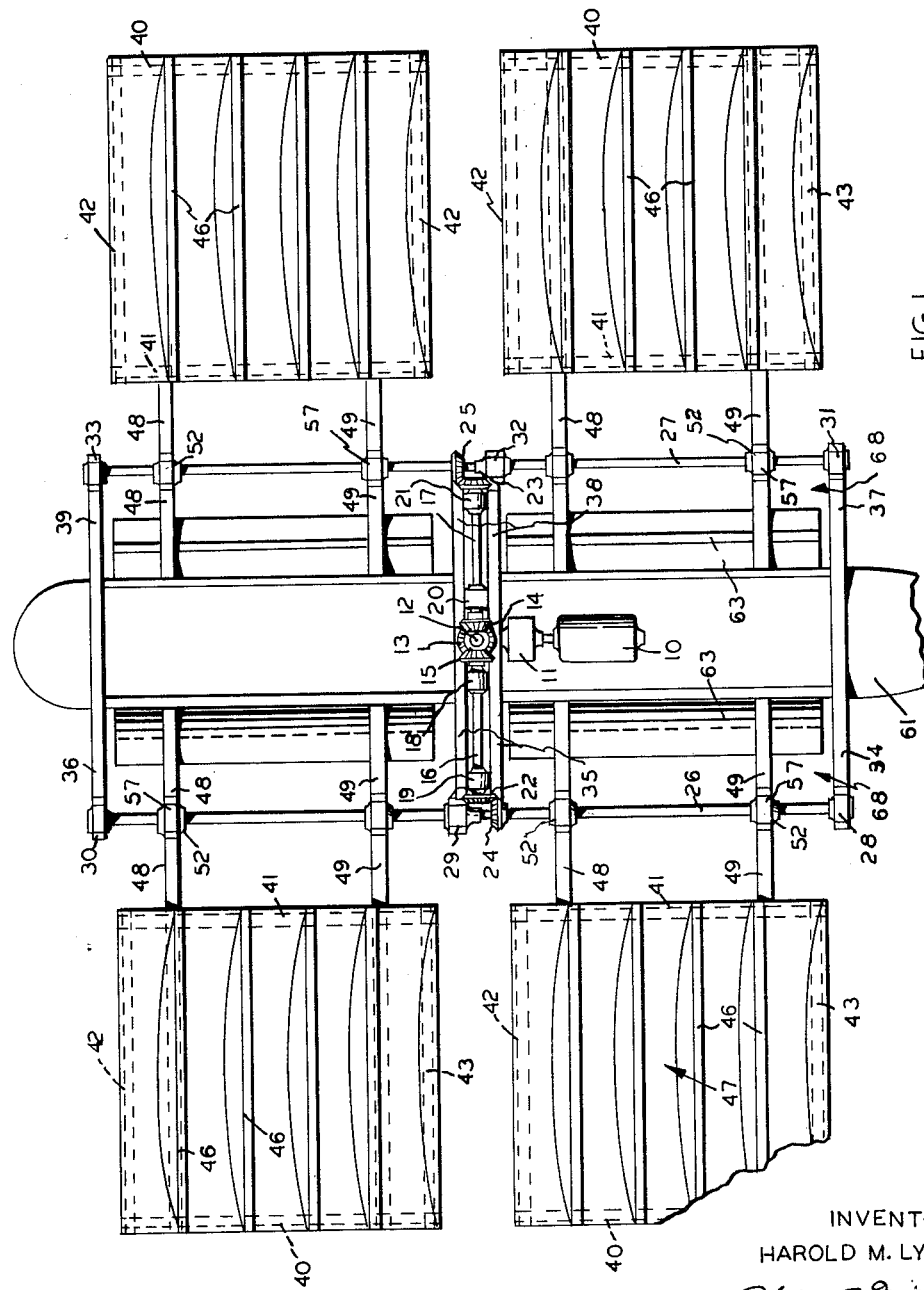
INVENTOR
HAROLD M. LYLE
ATTORNEY

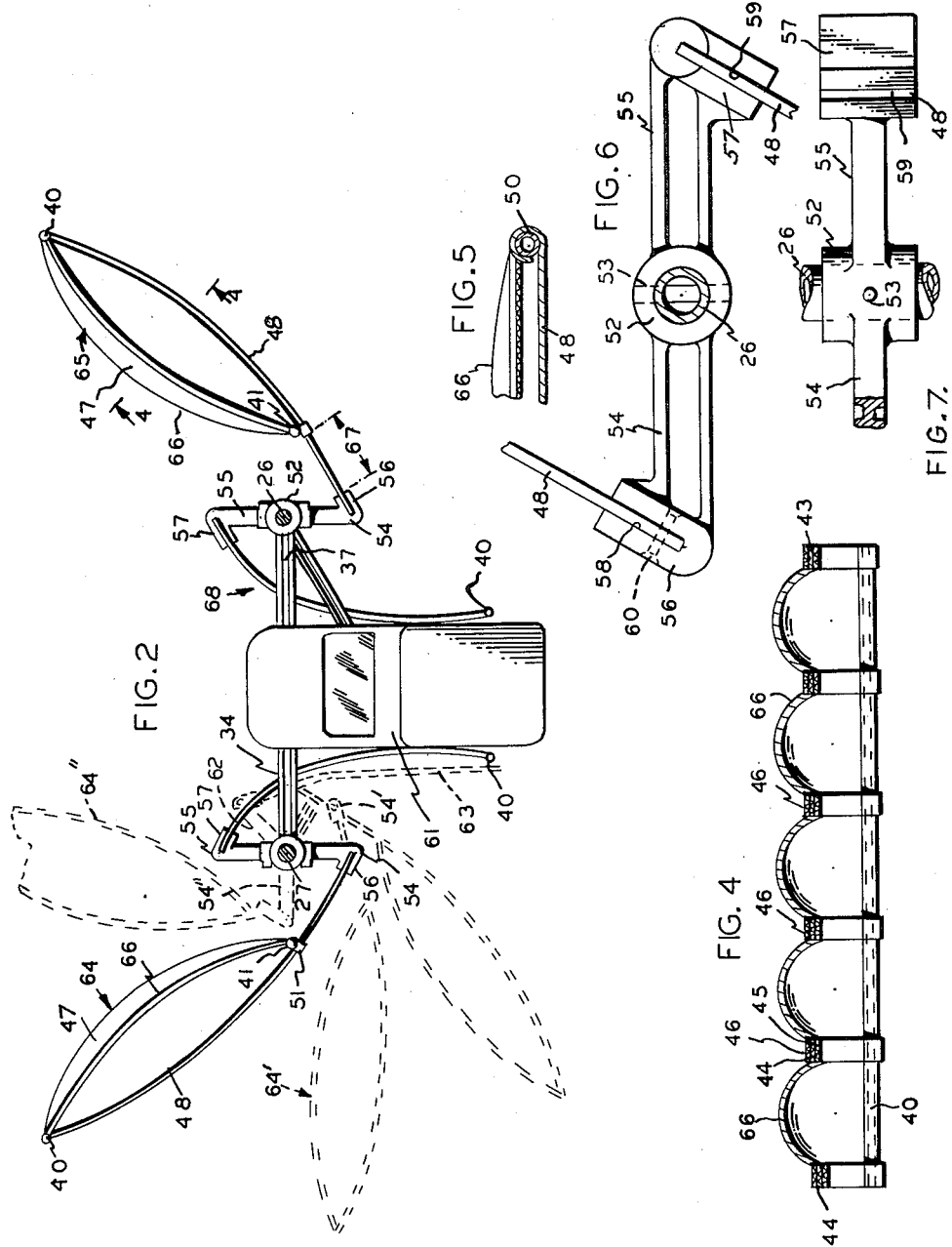

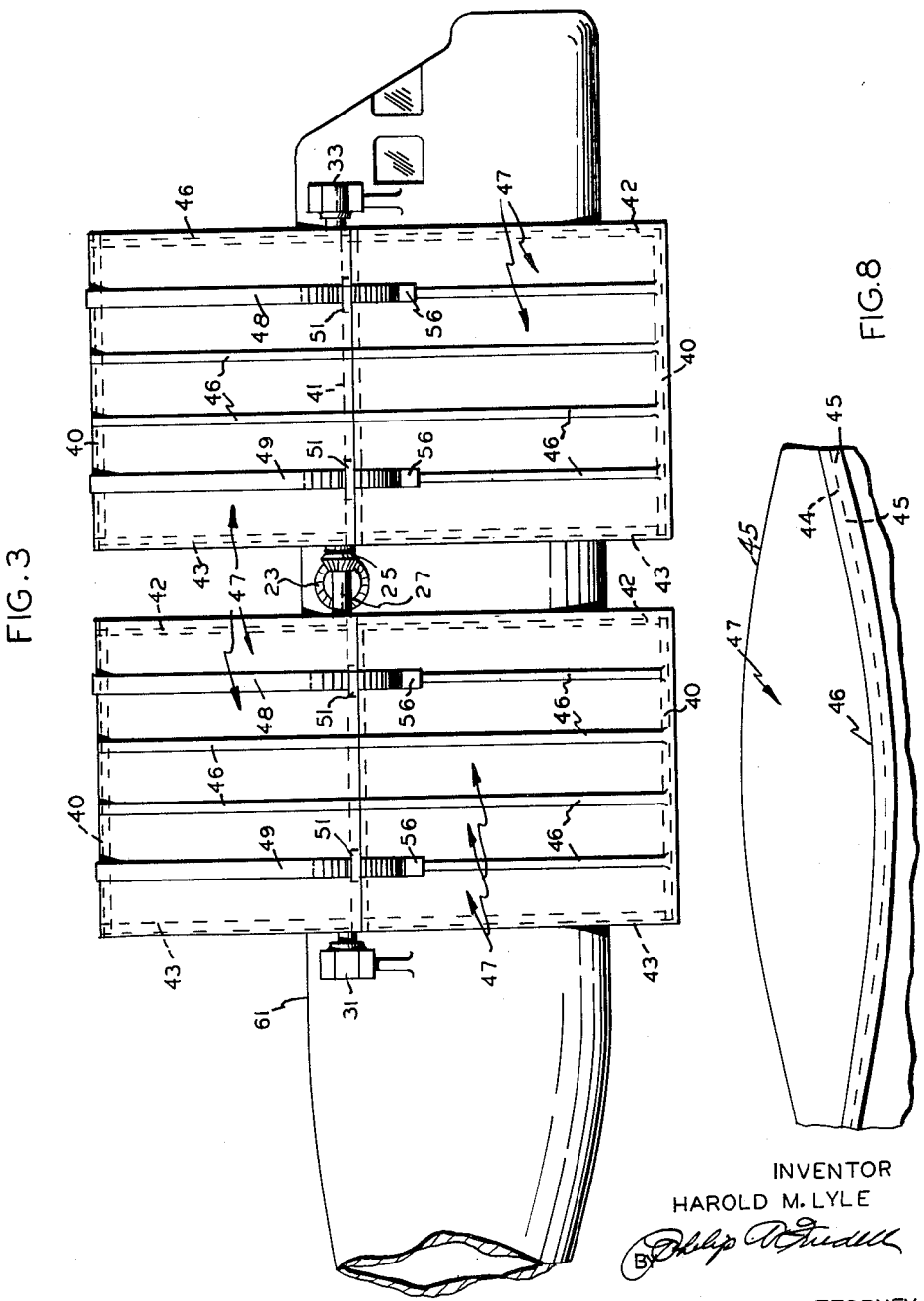

United States Patent Office 3,161,376
Patented Dec. 15, 1964

3,161,376
ORNITHOPTER TYPE AIRCRAFT
Harold M. Lyle, Rte. 3, Box 360, Snohomish, Wash.
Filed Jan. 21, 1963, Ser. No. 252,780
1 Claim. (Cl. 244—20)

This invention relates to improvements in aircraft, particularly ornithopters, and provides a wing structure of a new and differently operative arrangement, in which the wings do not reciprocate, but travel through a complete circle, with the wings retracted during the upstroke for minimum reaction while being effective for lift throughout the entire 180 degrees of lift stroke.

Furthermore, instead of a single wing which flaps up and down as is usual in ornithopters, in my invention a series of wings are included in each wing unit and which operate in follow relation, and therefore, the wings can be either operated at a lower speed, or the individual wings of a unit may be considerably reduced in area.

The wings are supported by spring arms, which on the down stroke, deflect downwardly while the flexible wing billows upwardly to reduce air slippage, and the arms are mounted in the ends of radial carrier arms, inclinedly toward the axis of the operating shaft, and thereby reduce the degree of bending through the reaction period as the wing is drawn through the retractive to the perpendicular position.

The objects and advantages of the invention are as follows:

First, to provide an ornithopter with non-reciprocating wings.

Second, to provide an ornithopter with wings which operate for lift through substantially a half circle with the wings being retracted through the remainder of the circle for minimum reaction.

Third, to provide an ornithopter as outlined with plural wing units, with the wings in equi-angular follow relation.

Fourth, to provide an ornithopter with wings supported by spring arms for deflection in opposition to the billowing of the wing.

Fifth, to provide operating means for the wings in the form of a shaft including rotative driving means therefor.

Sixth, to provide the shaft with equi-angularly spaced arms with the spring arms secured in the ends thereof and inclinedly toward the axis of the shaft for limited deflection during retraction.

Seventh, to provide an ornithopter in which the wings are operated in the simplest possible manner with a minimum of apparatus and connections.

Eighth, to provide wings with transverse reinforcements with intermediate billowing sections for additive billowing of the sections coupled to normal billowing of the wing as a whole.

In describing the invention reference will be had to the accompanying drawings, in which:

FIG. 1 is a top plan view of the invention with one wing of each unit extended and the other in the retractive position.

FIG. 2 is a front elevation of FIG. 1.

FIG. 3 is a side elevation of FIG. 2.

FIG. 4 is an enlarged section taken on the line 4—4 of FIG. 2.

FIG. 5 is an enlarged fragmentary sectional view showing the connection of the spring arm and the fabric to the wing tip reinforcement.

FIG. 6 is an enlarged front elevation of the spring arm mounting lever, and adapted for two wings in following relation.

FIG. 7 is a fragmentary top plan view of FIG. 6.

FIG. 8 is an enlarged view of one of the intermediate billowing sections of flexible material.

Though not so limited, the wings are shown as being driven by a motor 10, through a speed reducer and clutch 11, and driving through a vertical shaft 12 through bevel gearing, a bevel gear 13, which drives the bevel gears 14 and 15 in opposition and which are fixed on the transverse or intermediate shafts 16 and 17 which are suitably supported in bearings 18 and 19, and 20 and 21, and having the respective bevel gears 22 and 23 mounted on the ends thereof and which mesh with bevel gears 24 and 25 on the wing shafts 26 and 27, these wing shafts being rotatably mounted in bearings 28, 29 and 30, and, 31, 32 and 33, respectively, and which bearings are supported by arms 34, 35 and 36, and, 37, 38 and 39, respectively, with the arms fixed to a suitable supporting framework of the fuselage.

The wing shafts 26 and 27 are spaced sufficiently from the fuselage to permit the wings to be retracted therebetween, and which spacing would depend on the lateral spread of the wing and the resiliency of the resilient wing arms, along with the projection of the wing arm anchors.

The wings each are formed on a frame which consists of a rigid wing tip spaner 40, a relatively rigid inboard spanner 41, with the spanners connected by resilient side spanners 42 and 43.

The wings are formed of a suitable flexible material, such as a polyethylene or vinyl plastic, or a strong fabric, and each wing is formed of a series of sections similar to that shown in FIG. 8, to provide for billowing to reduce air slippage. The longitudinal edges 44 and 45 are secured together with reinforcements 46, these reinforcements having sufficient length to fold about the members 40 and 41 with the intervening portion taut when the wing is flat, therefore, when the wing operates on the downstroke, the intermediate portions 47 billow upwardly and form pockets, and collapse when the air pressure is neutral.

Spring arms 48 and 49 have their outer terminal ends connected to the wing tip spanner as indicated at 50 in FIG. 5, and their intermediate portion slidably connected to the inboard spanner as indicated at 51.

Though only two wings are shown in circular series, wings of considerably lesser area will be required if additional series wings are provided, since four circular series wings can readily operate perfectly, without mutual interference and with considerably less stress and strain, with a lesser cross sectional area required in the spring arms. And although only two spring arms are shown, a further advantage would be gained in still less cross-sectional area through the use of additional spring arms for each wing.

The spring arm anchors each have a hub 52 which is fixed on the wing shaft as indicated at 53, and from which hub radiates equiangularly spaced anchor arms 54 and 55 and which terminate in slotted anchor heads 56 and 57, with the wing spring arms fixed in the slots 58 and 59 as indicated at 60. The sweep of the anchor arms should be such as to clear the fuselage 61, and a further advantage is gained if the slots are inclined toward the axis of the hub, at an angle of 30 to 45 degrees, since the wing will be retracted to a greater degree before there is any deflection of the spring arm, as indicated at 62, with the wing suspended as indicated at 63 in FIG. 2. It will be noted that it would be impractical to fix the wing spring arms to, or close to the shaft as the strain would prove excessive.

For three wings in circular series, the spring arm anchors would be provided with three anchor arms spaced 120 degrees, while for four wings in circular series, the anchor arms would be spaced 90 degrees.

Viewing FIG. 2, the wings 64 and 65 are on the down or lift stroke, the spring arms being bowed downwardly as indicated at 48 and 49, with the wings billowed as indicated at 66. The free length 67 of the spring arm is exaggerated and can be considerably less proportionately since the side spanners of the wings are amply resilient for efficient retraction through the retraction slot 68 between the wing shaft and the fuselage.

It will be noted that when the wing 64 is in the position shown in FIG. 2, the anchor arm is perpendicular, in its lowermost position.

As the anchor arm moves to the 45 degree inward position indicated at 54', the wing is at maximum lift position, straight out from the fuselage, as indicated at 64', the wing sweeping downwardly and inwardly to the position 63 with the anchor arm at 62. Furthermore, as the anchor arm for wing 64 reaches the position 54'', the wing will have emerged from the retraction slot 68 and will have opened to its lift position as indicated at 64''.

Thus, the wings are fully expanded through approximately 180 degrees for maximum lift efficiency, and are collapsed through the remainder of their circular operation.

The flight and orienting controls, and not shown, since they do not form a part of the invention and are well known in the art, and best suited, are the conventional controls provided on helicopters, consisting of small power driven propellers mounted on vertical and horizontal axes, instead of the conventional elevators and rudders used on conventional aircraft.

I claim:

An improvement in an aircraft which flys by creating aerodynamic lifting forces through the rotative movement of wings about fuselage orientated longitudinal axes, wherein the wings are aerodynamically effective during downwardly rotative movements and ineffective during upwardly rotative movements about such axes, the improvement comprising in combination:

(a) a fuselage having wing camming surfaces and means to support fuselage orientated longitudinal axes structures on its respective sides at a wing passage restrictive area distance from its respective sides;

(b) axes structures rotatably positioned in the fuselage axes supporting means having radial arms terminating in structures which are adapted to provide angular near tangential supports for multiple transverse spring arms of adjustable wing-structure;

(c) a rotative power, drive and linkage means connected to the fuselage axes supporting means and to the rotative axes structures to rotate the rotative axes structures relative to the fuselage axes supporting means; and (d) adjustable wing structures secured to the rotative axes structures and positioned therefrom radially expanded during at least one-half of a revolution to produce positive lifting forces and positioned therefrom radially contracted during the remainder of the revolution to avoid producing a negative lifting force as the adjustable wing structures are rotated on the rotative axes structures by the action of the power, drive and linkage means through the wing passage restrictive area between the fuselage and the rotative axes structures, the fuselage serving as a camming surface to so radially contract the adjustable wing, having multiple transverse spring arms secured at spaced distances along the wing structures and terminating in supporting connections of the radial arms of the rotative axes structures, an outboard longitudinal spanner joining with the spaced outboard ends of the multiple transverse spring arms, an inboard longitudinal spanner slidably joining with the spaced multiple transverse spring arms between their centers and inboard ends, and wing air foil producing flexible materials secured between the outboard longitudinal spanner and the inboard longitudinal spanner arranged to be substantially taut and aligned with the transverse spring arms as the inboard longitudinal spanner slides toward the rotative axes structures during the upward rotative movement of the adjustable wing structures and arranged to be billowed upwardly as the inboard longitudinal spanner slides away from the rotative axes structures during the downward rotative movement of the adjustable wing structures.

References Cited by the Examiner

UNITED STATES PATENTS

| 621,368 | 3/99 | Parks | 170—147 |
|---------|------|-------|---------|
| 792,933 | 6/05 | Schweers | 244—27 |
| 910,683 | 1/09 | Hockstrasser | 244—22 |
| 1,730,758 | 10/29 | Caldwell | 244—22 |

FOREIGN PATENTS 400,021   5/09   France.

FERGUS S. MIDDLETON, *Primary Examiner.*